US010963955B2

(12) United States Patent
Caldwell

(10) Patent No.: US 10,963,955 B2
(45) Date of Patent: *Mar. 30, 2021

(54) OPTIMIZING AGGREGATION ROUTING OVER A NETWORK

(71) Applicant: MX Technologies, Inc., Lehi, UT (US)

(72) Inventor: John Ryan Caldwell, Lehi, UT (US)

(73) Assignee: MX TECHNOLOGIES, INC., Lehi, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/512,357

(22) Filed: Jul. 15, 2019

(65) Prior Publication Data

US 2019/0340681 A1 Nov. 7, 2019

Related U.S. Application Data

(63) Continuation of application No. 15/665,431, filed on Aug. 1, 2017, now Pat. No. 10,354,320, which is a (Continued)

(51) Int. Cl.
*G06F 15/16* (2006.01)
*G06Q 40/00* (2012.01)
(Continued)

(52) U.S. Cl.
CPC ............ *G06Q 40/00* (2013.01); *G06F 16/248* (2019.01); *G06F 16/2468* (2019.01);
(Continued)

(58) Field of Classification Search
CPC .. G06F 16/9535; G06F 16/248; G06F 40/174; H04L 43/0894; H04L 43/16; H04L 45/245
(Continued)

(56) References Cited

U.S. PATENT DOCUMENTS 5,835,915 A  11/1998  Carr et al.
7,185,104 B1  2/2007  Thorup et al.
(Continued)

FOREIGN PATENT DOCUMENTS

CN  108475249 B  1/2020
JP  2012-185615 A  9/2012
(Continued)

OTHER PUBLICATIONS

EP Patent Application No. 13841343.0 Communication pursuant to Article 94(3) EPC dated Jul. 18, 2019.
(Continued)

*Primary Examiner* — Moustafa M Meky
(74) *Attorney, Agent, or Firm* — Kunzler Bean & Adamson, PC

(57) ABSTRACT

Apparatuses, methods, systems, and program products are disclosed for optimizing aggregation routing over a network. An apparatus includes a processor and a memory that stores code executable by the processor. The code is executable by the processor to receive a request for aggregated account data accessible from a data aggregator server, select a data aggregator server from a plurality of data aggregator servers to service the request for the aggregated account data based on a plurality of factors associated with each of the plurality of data aggregator servers, format a request for the aggregated account data to be compatible with the selected data aggregator server, route the formatted request over the network to the selected data aggregator server, and receive the requested aggregated account data over the network from the selected data aggregator server.

20 Claims, 7 Drawing Sheets

Related U.S. Application Data continuation of application No. 15/174,620, filed on Jun. 6, 2016, now Pat. No. 9,741,073, which is a continuation of application No. 14/036,948, filed on Sep. 25, 2013, now Pat. No. 9,361,646.

(60) Provisional application No. 61/744,398, filed on Sep. 25, 2012.

(51) Int. Cl.

| | | |
|---|---|---|
| *G06Q 40/02* | (2012.01) | |
| *G06F 16/248* | (2019.01) | |
| *G06F 16/2458* | (2019.01) | |
| *G06F 16/9535* | (2019.01) | |
| *G06Q 20/10* | (2012.01) | |
| *G06F 40/174* | (2020.01) | |
| *G06Q 20/14* | (2012.01) | |
| *H04L 12/26* | (2006.01) | |
| *H04L 12/709* | (2013.01) | |
| *G06Q 20/40* | (2012.01) | |

(52) U.S. Cl.
CPC ........ *G06F 16/9535* (2019.01); *G06F 40/174* (2020.01); *G06Q 20/10* (2013.01); *G06Q 20/102* (2013.01); *G06Q 20/14* (2013.01); *G06Q 20/407* (2013.01); *G06Q 40/02* (2013.01); *G06Q 40/12* (2013.12); *H04L 43/0894* (2013.01); *H04L 43/16* (2013.01); *H04L 45/245* (2013.01)

(58) Field of Classification Search
USPC ........................................................ 709/224
See application file for complete search history.

(56) References Cited

U.S. PATENT DOCUMENTS

| | | | |
|---|---|---|---|
| 7,266,602 B2 | 9/2007 | Givoly | |
| 7,552,190 B1 | 6/2009 | Freishtat et al. | |
| 7,673,327 B1 | 3/2010 | Polis et al. | |
| 7,792,717 B1 | 9/2010 | Hankins et al. | |
| 7,793,148 B2 | 9/2010 | Beardsley et al. | |
| 8,001,040 B2 | 8/2011 | Keithley | |
| 8,051,017 B2 | 11/2011 | Munson et al. | |
| 8,086,528 B2 | 12/2011 | Barrett et al. | |
| 9,361,646 B2 * | 6/2016 | Caldwell | G06F 16/9535 |
| 9,741,073 B2 * | 8/2017 | Caldwell | G06F 16/2468 |
| 10,354,320 B2 * | 7/2019 | Caldwell | G06Q 20/10 |
| 10,650,472 B2 * | 5/2020 | Brinkman | G06Q 40/12 |
| 2005/0234824 A1 | 10/2005 | Gill et al. | |
| 2006/0212586 A1 | 9/2006 | Givoly | |
| 2008/0165789 A1 | 7/2008 | Ansari et al. | |
| 2010/0262536 A1 | 10/2010 | Barrett et al. | |
| 2013/0124640 A1 | 5/2013 | Franco et al. | |
| 2015/0066719 A1 * | 3/2015 | Agrawal | G06Q 40/02 705/35 |
| 2015/0134817 A1 | 5/2015 | Edwards | |
| 2016/0219459 A1 * | 7/2016 | Buddhikot | H04B 17/318 |
| 2016/0219588 A1 * | 7/2016 | Buddhikot | H04L 41/0896 |
| 2017/0201571 A1 * | 7/2017 | Sherf | H04L 43/0817 |
| 2018/0122017 A1 * | 5/2018 | Brinkman | G06Q 40/12 |
| 2019/0356643 A1 | 11/2019 | Caldwell | |
| 2020/0067899 A1 | 2/2020 | Caldwell | |
| 2020/0067900 A1 | 2/2020 | Caldwell | |
| 2020/0106759 A1 | 4/2020 | Caldwell | |
| 2020/0112553 A1 | 4/2020 | Caldwell | |
| 2020/0169544 A1 | 5/2020 | Caldwell | |
| 2020/0169545 A1 | 5/2020 | Caldwell | |
| 2020/0175584 A1 * | 6/2020 | Agrawal | G06Q 40/02 |

FOREIGN PATENT DOCUMENTS

| | | |
|---|---|---|
| JP | 6682689 B2 | 4/2020 |
| WO | 02019229 A2 | 3/2002 |

OTHER PUBLICATIONS

CA Patent Application No. 3,004,338 Office Action dated Jun. 27, 2019.
JP Patent Application No. 2018-524464 Office Action dated Jul. 11, 2019.
AU Patent Application No. 2019204122 Examination Report No. 1 for standard patent application dated Jul. 4, 2019.
JP Patent Application No. 2018-524464 Notice of Allowance dated Aug. 28, 2019.
CN Patent Application No. 2016800778918 Second Office Action dated Sep. 4, 2019.
Japan Application No. 2019-171239, Notice of Allowance, dated Feb. 25, 2020, pp. 1-3.
Indian Application No. 489MUMNP2015, Office Action, dated Mar. 5, 2020, pp. 1-8.
European Application No. 13841343.0, Summons to Oral Proceedings, dated Feb. 17, 2020, pp. 1-9.
AU Patent Application No. 2019204122, Examination Report No. 2 for standard patent application, dated Dec. 13, 2019, pp. 1-7.
JP Patent Application No. 2019-171239, Office Action-Notice of Reasons for Rejection, dated Jan. 20, 2020, pp. 1-2.

* cited by examiner

OPTIMIZING AGGREGATION ROUTING OVER A NETWORK

CROSS-REFERENCE TO RELATED APPLICATIONS

This application is a continuation of U.S. patent application Ser. No. 15/665,431, filed Aug. 1, 2017, which is a continuation of U.S. application Ser. No. 15/174,620, filed Jun. 6, 2016, which is a continuation of U.S. application Ser. No. 14/036,948, filed Sep. 25, 2013, which claims the benefit of U.S. Provisional Application No. 61/744,398, filed Sep. 25, 2012, each of which is hereby incorporated by reference herein in its entirety, including but not limited to those portions that specifically appear hereinafter, the incorporation by reference being made with the following exception: In the event that any portion of the above-referenced provisional application is inconsistent with this application, this application supersedes said above-referenced provisional application.

BACKGROUND

Advances in network and computing technology have provided institutions, such as financial institutions, the ability to amass large amounts of data related to the transactions of clients. With specific reference to the financial industry, there are more than 10,000 financial institutions (including banks, credit unions, credit cards, stock brokerages, etc.), plus many thousands of other participants who need access to and use of data from the financial institutions. Due to the huge volume of participants, efficient structures and techniques are needed to access, share, and utilize data from institutions, including the financial institutions.

Typically databases storing these large amounts of data from institutions that provide users with accounts are connected through vast computing networks such that account data may be accessed by, shared with, and utilized by enterprising entities to provide new conveniences and advantages.

The disclosure relates generally to providing aggregation services over computer networks. The disclosure relates more particularly, but not necessarily entirely, to a system for improved use of aggregation services, whether in the financial industry or other industries that provide users with accounts, relative to account transactional data.

The features and advantages of the disclosure will be set forth in the description which follows, and in part will be apparent from the description, or may be learned by the practice of the disclosure without undue experimentation. The features and advantages of the disclosure may be realized and obtained by means of the computing systems and combinations of firmware, software and hardware, particularly pointed out in the appended claims.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
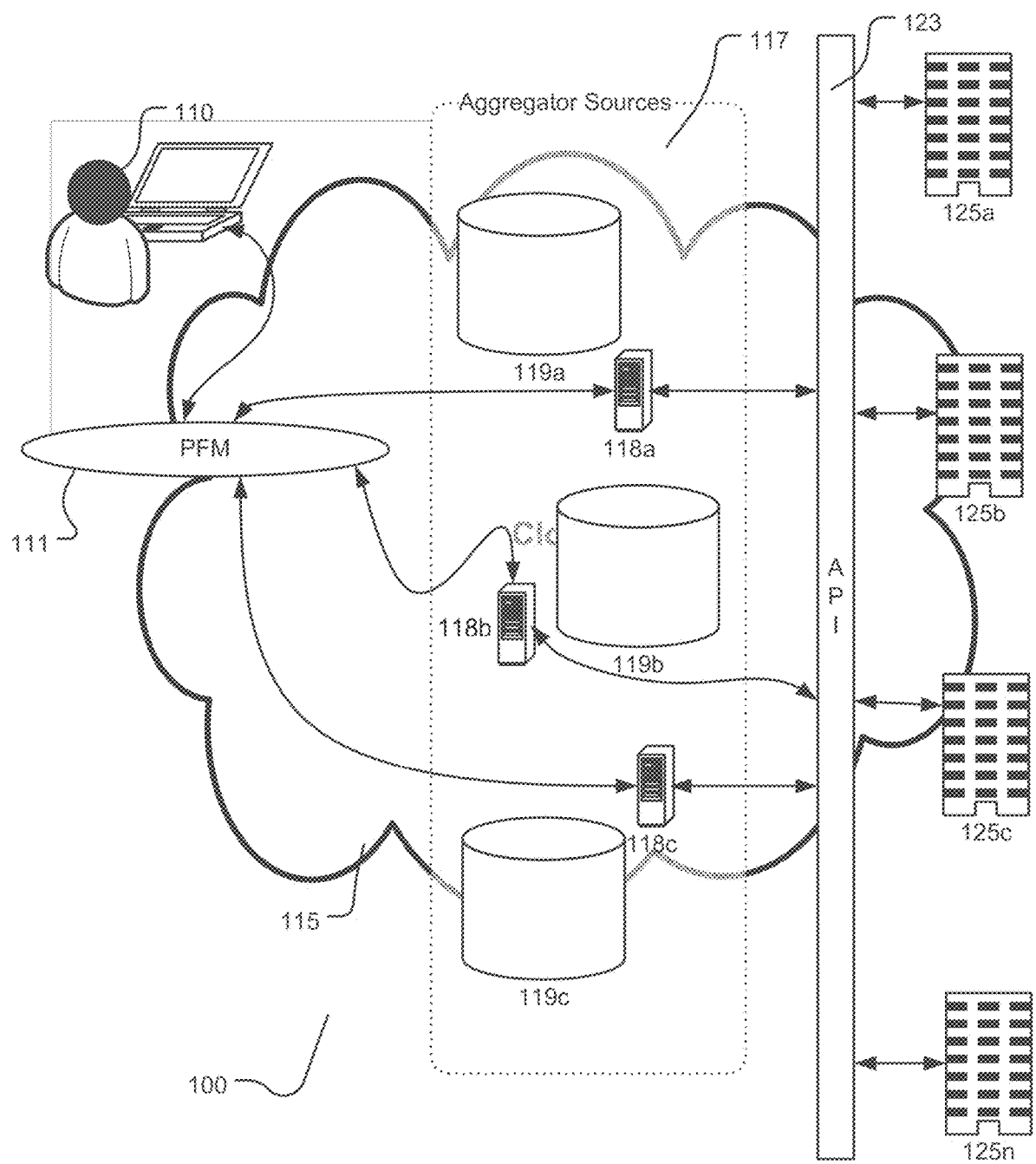
FIG. 1 illustrates an implementation of an exemplary computing network that may be used by the financial industry in accordance with the principles and teachings of the disclosure.

The disclosure extends to methods, systems, and computer based products for optimizing the use of aggregation sources in the financial services industry. In the following detailed description of the disclosure, reference is made to the accompanying figures, which form a part hereof, and in which is shown by way of illustration specific implementations in which the disclosure may be practiced. It is understood that other implementations may be utilized and structural changes may be made without departing from the scope of the disclosure.

As used herein "user" could be an individual or an entity that can utilize aggregated information.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

It will be appreciated that fdata aggregators may be involved in compiling information and data from detailed databases regarding individuals and providing or selling that information to others, such as personal financial management providers or others in various industries. The potential of the Internet to consolidate and manipulate information has a new application in data aggregation, which is also known as screen scraping.

The Internet and personal management providers allow users the opportunity to consolidate their usernames and passwords, or PINs in one location. Such consolidation enables consumers to access a wide variety of PIN-protected websites containing personal information by using one master PIN on a single web site, such as through a personal financial management provider or otherwise. Online account providers include financial institutions, stockbrokers, airline and frequent flyer and other reward programs, and e-mail accounts.

Data aggregators may gather account or other information about individuals from designated websites by using account holders' PINs, and then making the users' account information available to them at a single web site operated by the aggregator or other third party at an account holder's request. Aggregation services may be offered on a stand-alone basis or in conjunction with other financial services, such as portfolio tracking and bill payment provided by a specialized website, or as an additional service to augment the online presence of an enterprise established beyond the virtual world, such as a banking or financial institution.

Many established companies with an Internet presence recognize the value of offering an aggregation service to enhance other web-based services and attract visitors to their websites. Offering a data aggregation service to a website may be attractive because of the potential that it will frequently draw users of the service to the hosting website. However, a problem may arise when a data aggregator's services are temporarily halted, become too expensive for third party businesses to utilize or otherwise become unavailable for some reason. The result is that account information may need to be moved by a user or third party to another data aggregator or institution, such as a personal financial management provider or financial institution.

It will be appreciated that the disclosure relates to data aggregation generally, but for purposes of streamlining the disclosure specific reference is made to the financial industry, although all industries that use the services of data aggregators falls within the scope of the disclosure.

FIG. 1 illustrates an implementation of an exemplary computing network that may be used by the financial industry. As can be seen in the figure a user 110 may be in electronic communication through a computing network 115 with a plurality of financial institutions 125a, 125b, 125c . . . 125n. The user 110 may access the network 115 through a personal financial manager (PFM) 111 that may be provided by one of the financial institutions 125 or may be provided by a third party provider. In order to make use of the vast amounts of financial data available from the various financial institutions 125, a plurality of aggregation sources 117 may be used by the system to aggregate financial information through an application program interface (API) 123.

As illustrated in FIG. 1, the aggregation sources may utilize computing components such as servers 118a, 118b, 118c each managing databases 119a, 119b, 119c. It should be noted that in some implementations, the network may be the Internet or alternatively the network may be a proprietary network system. The network 115 may operate according to typical networking protocols and security programs as is known in the industry.

Additionally, as can be seen in FIG. 1, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., an "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined herein is not necessarily limited to the described features or acts described above. Rather, the described features and acts are disclosed as examples.

Those skilled in the art will appreciate that the disclosure may be practiced in network computing environments with many types of computer system configurations, including, personal computers, desktop computers, laptop computers, message processors, control units, camera control units, hand-held devices, hand pieces, multi-processor systems, microprocessor-based or programmable consumer electronics, network PCs, minicomputers, mainframe computers, mobile telephones, PDAs, tablets, pagers, routers, switches, various storage devices, and the like. It should be noted that any of the above mentioned computing devices may be provided by or located within a brick and mortar location.

The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) or field programmable gate arrays can be programmed to carry out one or more of the systems and procedures described herein. Certain terms are used throughout the following description to refer to particular system components. As one skilled in the art will appreciate, components may be referred to by different names. This document does not intend to distinguish between components that differ in name, but not function.

Figure 2:
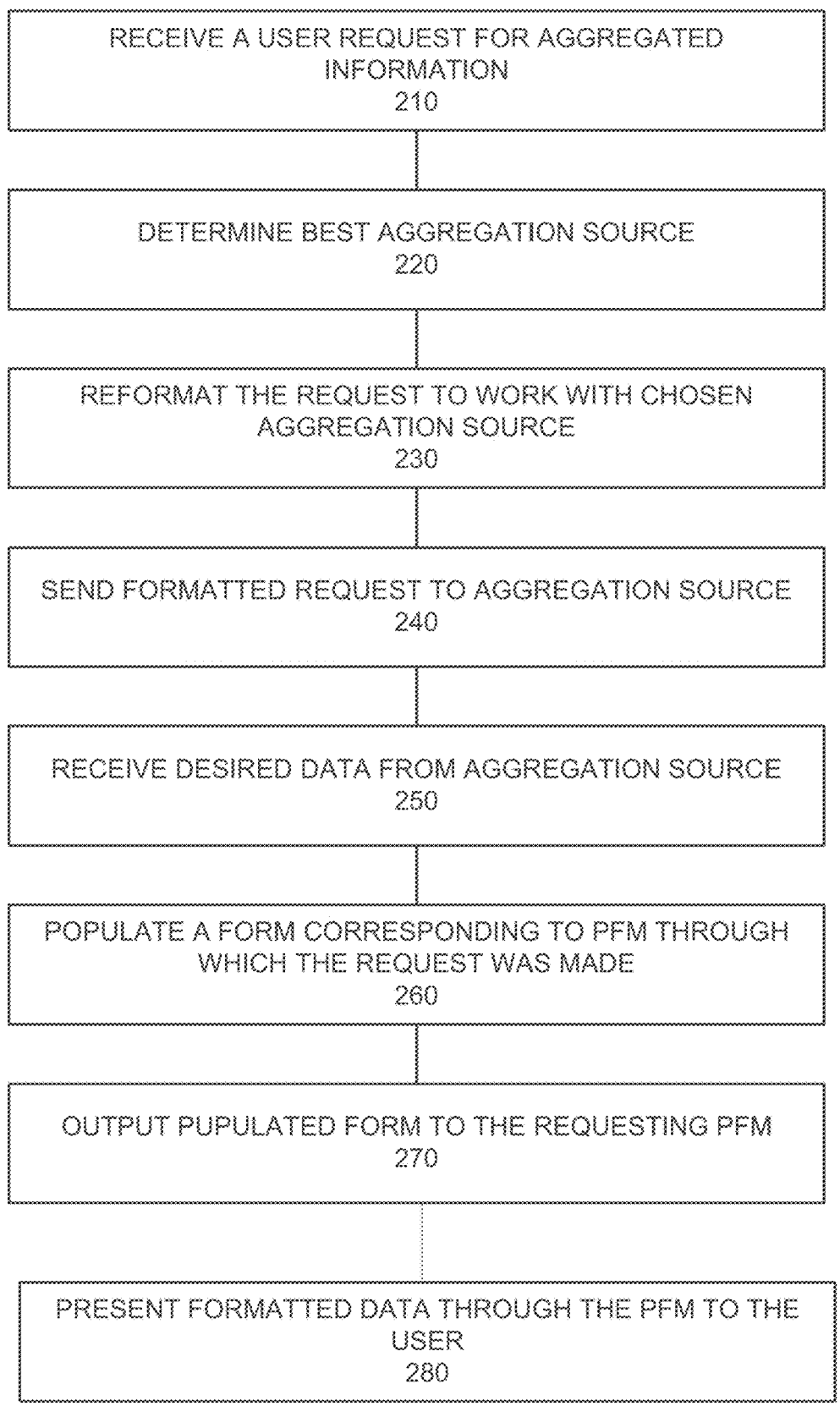
FIG. 2 illustrates a method to determine the optimal aggregation source in accordance with the principles and teachings of the disclosure.

FIG. 2 illustrates a method to determine the optimal aggregation source. The method is performed within a computing environment wherein instructions for performing processes may be executed by a computer processor. Additionally, as will be discussed below in greater detail, a plurality of aggregation sources may be used concurrently, or may be used consecutively, in order to optimize the aggregation of data, such as financial data, email account data, frequent flyer account data or other account data.

As illustrated in the figure, an aggregation source optimization system may receive a user request for aggregated information at 210. Such a request may be made through a PFM that provides a convenient user interface to the user by way of a network.

At 220, an optimal aggregation source may be determined. In an implementation, an optimal aggregation source may be determined by a certain setting or a simple or complex algorithm, or by a series of preference criteria. Such determining factors may include, by way of example only, aggregation source, cost of the aggregator's service, speed of the aggregator, historical reliability of the aggregation source, feasibility (whether the aggregator carries the desired type of information), support (whether the aggregator supports the financial institution whose data is requested), business partnering relationships, which may influence aggregation source selection, last source used and/or any factors that influence desirability of a data aggregator may be taken into consideration. Determining the most suitable or preferred data aggregator may involve assigning an importance criteria or threshold to each factor and then finding a weighted average of the selection criteria.

At 230, the request for aggregated information may be reformatted to better correspond to the selected optimal aggregation source. For example, an aggregation source may have a dedicated API having fields therein to facilitate accurate and efficient communication between computing components over the network. It should be noted also, that some implementations may comprise direct access functionality. Such direct access functionality is considered to be within the scope of this disclosure.

At 240, the properly formatted request for aggregated information may be routed and sent over the network to the aggregation source. The formatted request may comprise identifiers and security protocols that correspond to the selected aggregation source.

At 250, the requested aggregation information may be received and stored in memory that is accessible by the user and/or a PFM. At 260, fields within the PFM may be populated such that the aggregation information may be formatted for use by the PFM. At 270, the populated forms may be outputted to the PFM for use in presenting the aggregation information/data to the user in a meaningful way at 280.

If needed, the method may further reformat the data provided by the aggregator and return to the original request at 210. It is possible to obtain data from more than one data aggregator if the situation requires it. In additional implementations, after the data has been received, the PFM or any other legitimate user of the data may then perform any desired manipulation of the aggregation information.

For example, a process for aggregation data source matching and merging may be employed. The process of taking two or more sets of data such as, but not limited to, financial account data, and running an analysis on areas where the data might overlap, one example may be by a date range of transactions and then determining the likelihood of the sets of data being in fact the same original source of data. Other data points, in addition to any overlapped data, may be used, in the example of financial account data, such as financial institution name, account number, account type, account description or any other similar data points.

For clarity, a hypothetical example provides that a checking account from Acme Bank may be aggregated from a source like OFX for a period of time, but then that institution's OFX server becomes unavailable, and a different source may be switched to a different aggregator such as ByAllAccounts. It may be advantageous for the old account data (from the OFX feed, which may go back years and already have custom categorization, tagging, memos, splits and the like) to not only be replaced by the new data feed (which may only go back a month or two and clearly does not have the custom data) but to be merged with the new data. An obvious problem is that the new data feed may not have the same fields available or may name those fields differently and therefore may determine that the new source is not just a new source for the same (identical) accounts at Acme Financial, but rather are mistaken as new accounts. For even a more specific example, OFX may have called the exact same checking account "Free Checking "0278" where the switched to ByAllAccounts feed will call it "Acme Freechecking "0278". The system needs to recognize that the two accounts, although named something slightly, and sometimes completely, different, is actually the exact same account to Acme Financial and the account holder (or end-user) and determine the two accounts should be merged.

A system and method have been invented for governing the determining of whether the accounts are in fact the same where such may determine a probability of the accounts being the same using several key factors. The system and method covers any formula that may be desired to be implemented, and are not limited by the examples discussed herein.

Once the two accounts are determined as the same, one of the final steps being to match the overlapping transactions themselves, then the accounts need to be merged into one and the same. Allowing the new reliable, at least up, or simply selected aggregation source to have all the old data with the custom additions appended to the new data.

Therefore when it is desired to switch data aggregators, it is typically desirable to keep the historical data from the previous aggregator and to merge with it or append to it the data from the new aggregator. Due to differences in the type of data organization used by the two aggregators, and differences in the names of the fields of data, it may not be immediately apparent whether the data fields match or not. It is possible to look at sample transactions from the data from both aggregators, such as the last 10 transactions, and compare fields for a match. If those transactions match for a large percentage of the fields, then the system can conclude that it is highly likely the accounts are the same and it can reformat the data if necessary and where appropriate and/or desired merge the data from the two aggregators. For example, if the system determines that important fields such as transaction amount, transaction date, vendor, etc. match for several transactions, then a match is found and the data can be merged. This process can be viewed as a field-by-field match or overlay. It is possible to conclude that there is a match if a percentage of the fields (or verification criteria) match, such as 80% or some other desired match success threshold. The above example illustrates just one use of aggregation information from an optimized aggregation source, and should not be considered limiting.

An implementation of a method for optimizing aggregation routing over a network of computers may comprise: receiving a request from a user for aggregated account data through a PFM; retrieving a predetermined form for the account data corresponding to the requesting PFM; determine the optimal aggregation source corresponding to the request; reformat the request to be compatible with the optimal aggregation source; send the reformatted request to the optimal aggregation source over the network of computers; receive requested data from the optimal aggregation source over the network of computers; populate the predetermined form corresponding to the PFM; output the populated form to the requesting PFM; present the aggregated account data by way of the PFM to the user.

Figure 3:
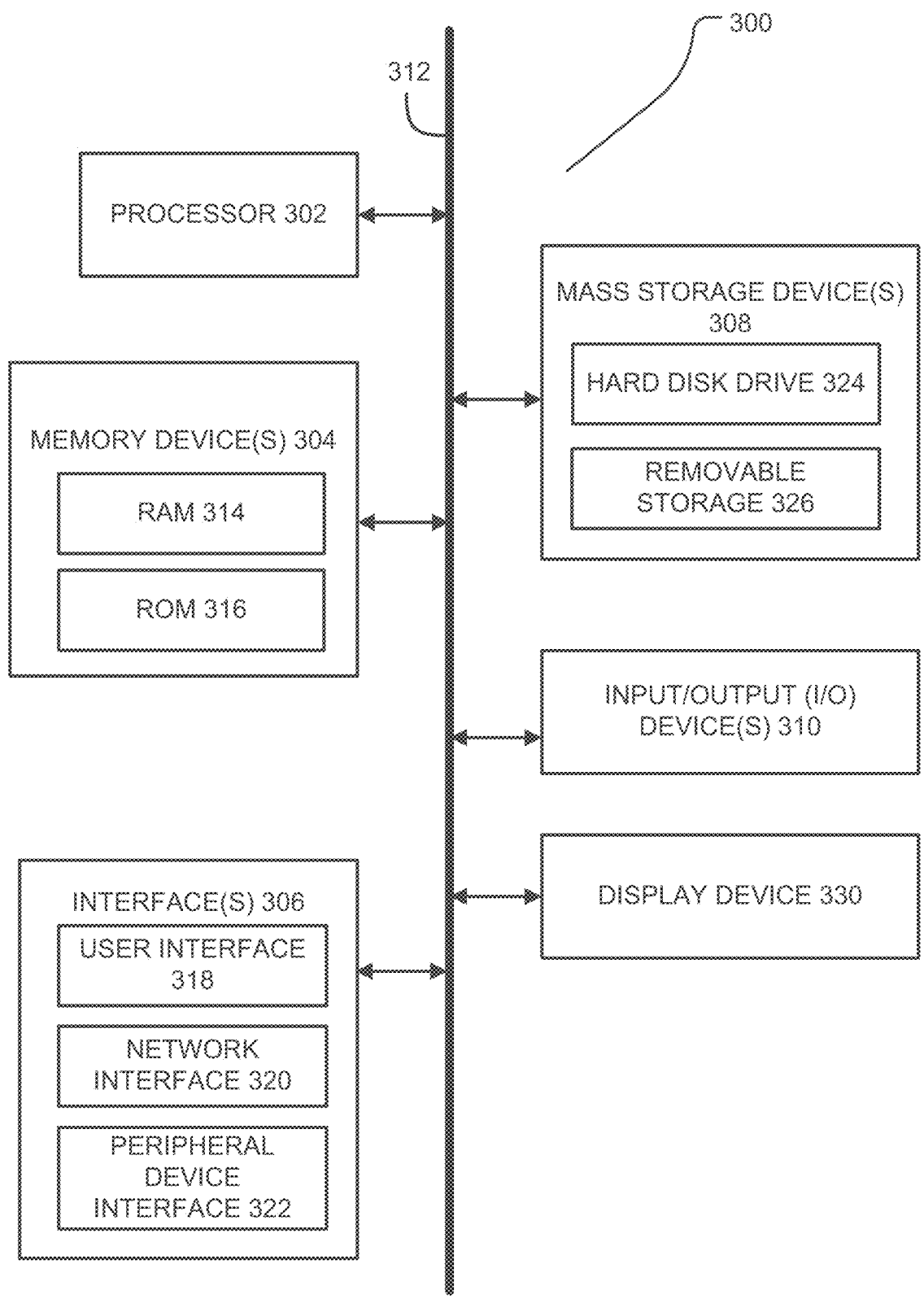
FIG. 3 is a block diagram illustrating an example computing device that may be used to perform various procedures in accordance with the principles and teachings of the disclosure.

FIG. 3 is a block diagram illustrating an example computing device 300. Computing device 300 may be used to perform various procedures, such as those discussed herein. Computing device 300 can function as a server, a client, or any other computing entity. Computing device 300 can perform various monitoring functions as discussed herein, and can execute one or more application programs, such as the application programs described herein. Computing device 300 can be any of a wide variety of computing devices, such as a desktop computer, a notebook computer, a server computer, a handheld computer, camera control unit, tablet computer and the like.

Computing device 300 includes one or more processor(s) 302, one or more memory device(s) 304, one or more interface(s) 306, one or more mass storage device(s) 308, one or more Input/Output (I/O) device(s) 310, and a display device 330 all of which are coupled to a bus 312. Processor(s) 302 include one or more processors or controllers that execute instructions stored in memory device(s) 304 and/or mass storage device(s) 308. Processor(s) 302 may also include various types of computer-readable media, such as cache memory.

Memory device(s) 304 include various computer-readable media, such as volatile memory (e.g., random access memory (RAM) 314) and/or nonvolatile memory (e.g., read-only memory (ROM) 316). Memory device(s) 304 may also include rewritable ROM, such as Flash memory.

Mass storage device(s) 308 include various computer readable media, such as magnetic tapes, magnetic disks, optical disks, solid-state memory (e.g., Flash memory), and so forth. As shown in FIG. 3, a particular mass storage device is a hard disk drive 324. Various drives may also be included in mass storage device(s) 308 to enable reading from and/or writing to the various computer readable media. Mass storage device(s) 308 include removable media 326 and/or non-removable media.

I/O device(s) 310 include various devices that allow data and/or other information to be input to or retrieved from computing device 300. Example I/O device(s) 310 include digital imaging devices, electromagnetic sensors and emitters, cursor control devices, keyboards, keypads, microphones, monitors or other display devices, speakers, printers, network interface cards, modems, lenses, CCDs or other image capture devices, and the like.

Display device 330 includes any type of device capable of displaying information to one or more users of computing device 300. Examples of display device 330 include a monitor, display terminal, video projection device, and the like.

Interface(s) 306 include various interfaces that allow computing device 300 to interact with other systems, devices, or computing environments. Example interface(s) 306 may include any number of different network interfaces 320, such as interfaces to local area networks (LANs), wide area networks (WANs), wireless networks, and the Internet. Other interface(s) include user interface 318 and peripheral device interface 322. The interface(s) 306 may also include one or more user interface elements 318. The interface(s) 306 may also include one or more peripheral interfaces such as interfaces for printers, pointing devices (mice, track pad, etc.), keyboards, and the like.

Bus 312 allows processor(s) 302, memory device(s) 304, interface(s) 306, mass storage device(s) 308, and I/O device(s) 310 to communicate with one another, as well as other devices or components coupled to bus 312. Bus 312 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 300, and are executed by processor(s) 302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Some financial institutions may provide their data via multiple APIs such as MDX, OFX, CUFX and others. Also, some financial institutions also may have their data gathered by a plurality of data aggregators such as ByAllAccounts, Intuit, Yodlee, CashEdge and others.

In an implementation, once an aggregator receives data from a financial institution that data may be available to entities that can show they have a legitimate right to access the data, such as by providing relevant security information, and or have an agreement with the aggregator to be able to have access to that data. An example of a party who has a legitimate right to access financial institution data is a personal financial management software provider (as requested by an end user of the service). PFM software may enable a user to review account balances, conduct transactions, budget funds, pay bills, etc.

It should be noted, that because of the limited financial institution coverage of most APIs and aggregators, the unreliable nature of many of them, the data fields some are missing which others may have, the limited time periods some are restricted to, and other factors, it may be difficult to get the best quality data from just one API or aggregating source. To compensate for the above issues, a method or system is needed for determining the optimal aggregation source to use.

Figure 4:
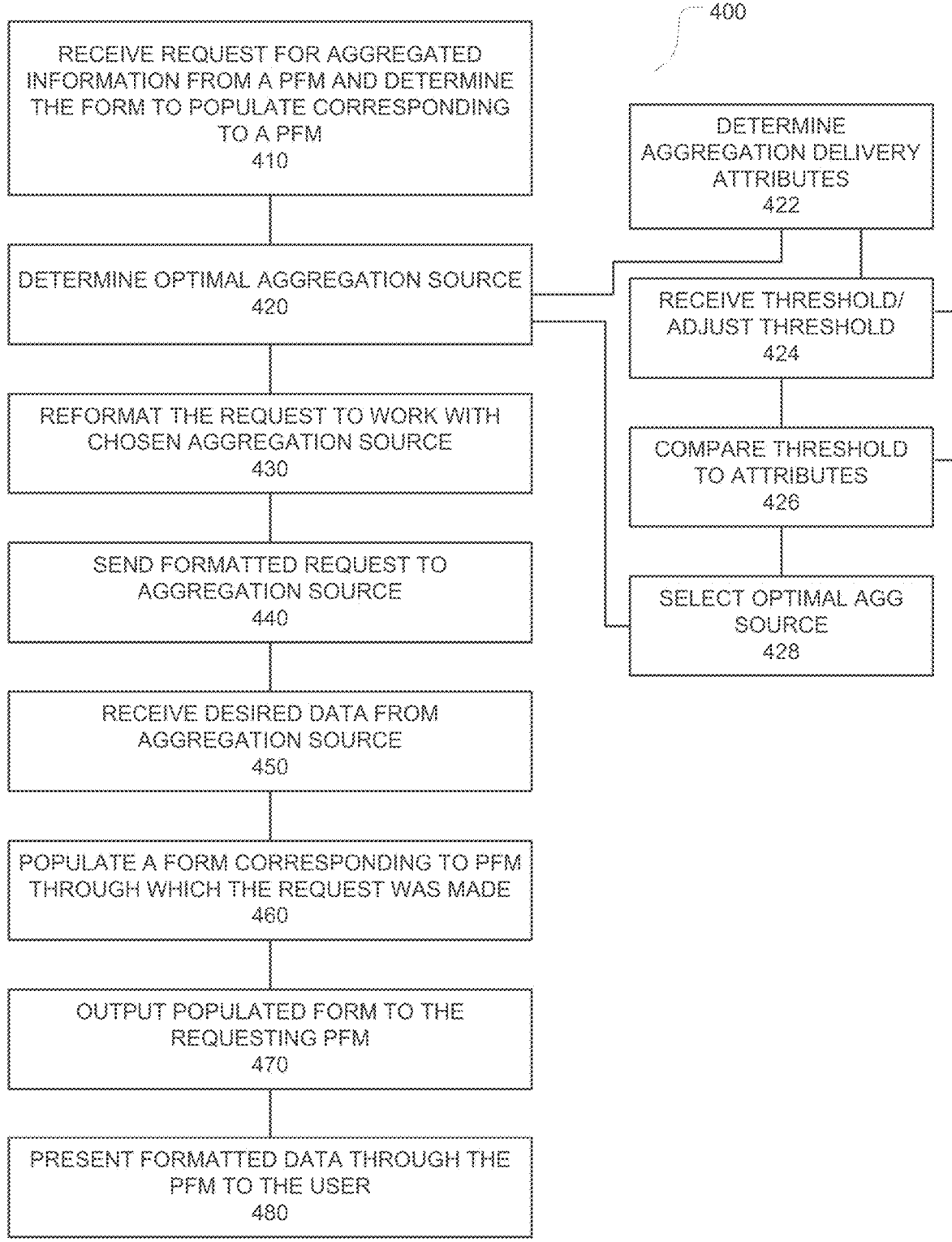
FIG. 4 illustrates a method for determining an optimal aggregation source using operational thresholds relative to aggregation source attributes in accordance with the principles and teachings of the disclosure.

FIG. 4 illustrates a method for determining an optimal aggregation source using operational thresholds relative to aggregation source attributes. As will be discussed relative to the figure, different aggregation sources may provide differing levels of service attributes. For example, for certain types of account aggregation data, aggregation source 118a (illustrated in FIG. 1) may provide a more complete transaction history, while aggregation source 118b (illustrated in FIG. 1) may provide the aggregation information the fastest. As with most industries, cost may be a very motivating factor. Accordingly, aggregation source 118c (illustrated in FIG. 1) may provide the lowest cost. The user may determine or select the service attributes of most importance based on business or other operational decisions.

FIG. 4 illustrates a method for taking the attributes/ advantages of the varying aggregation sources 118 from FIG. 1 into account while determining the optimal aggregation source for any user request. In use, method 400 may comprise the process of receiving a request for aggregated information at 410. The request may come through a PFM. Additionally, the PFM may dictate the final form of aggregated information that will be needed to complete the request.

At 420, an optimal aggregation source may be determined based on the nature of the request. The process at 420 of determining an optimal aggregation source may comprise: identifying aggregation source delivery attributes at 422. At 424, thresholds may be received or set within the system for comparing aggregation source attributes and advantages/shortcomings. It should be noted that the comparison thresholds may be determined on the fly, or may be predetermined within a system that is performing the steps of the method 400. At 426, once the thresholds have been determined the aggregation source attributes may be compared. It will be appreciated that the comparison threshold may correspond to robustness of account information received from each of the aggregation sources. At 428, the optimal aggregation source may be selected based upon the comparison made at 426.

At 430, once an optimal aggregation source has been determined, the user request made through the PFM at 410 may be reformatted to conform to the requirements of the selected aggregation source.

At 440, the properly formatted request may be routed to the selected aggregation source over a network.

At 450, the requested aggregated data may then be received from the aggregation source. At 460, a form or storage array corresponding to the PFM may be populated with the aggregation data and stored in computer memory.

At 470, the populated forms may be outputted to the PFM for use in presenting the aggregation information/data to the user in a meaningful way at 480.

Figure 5:
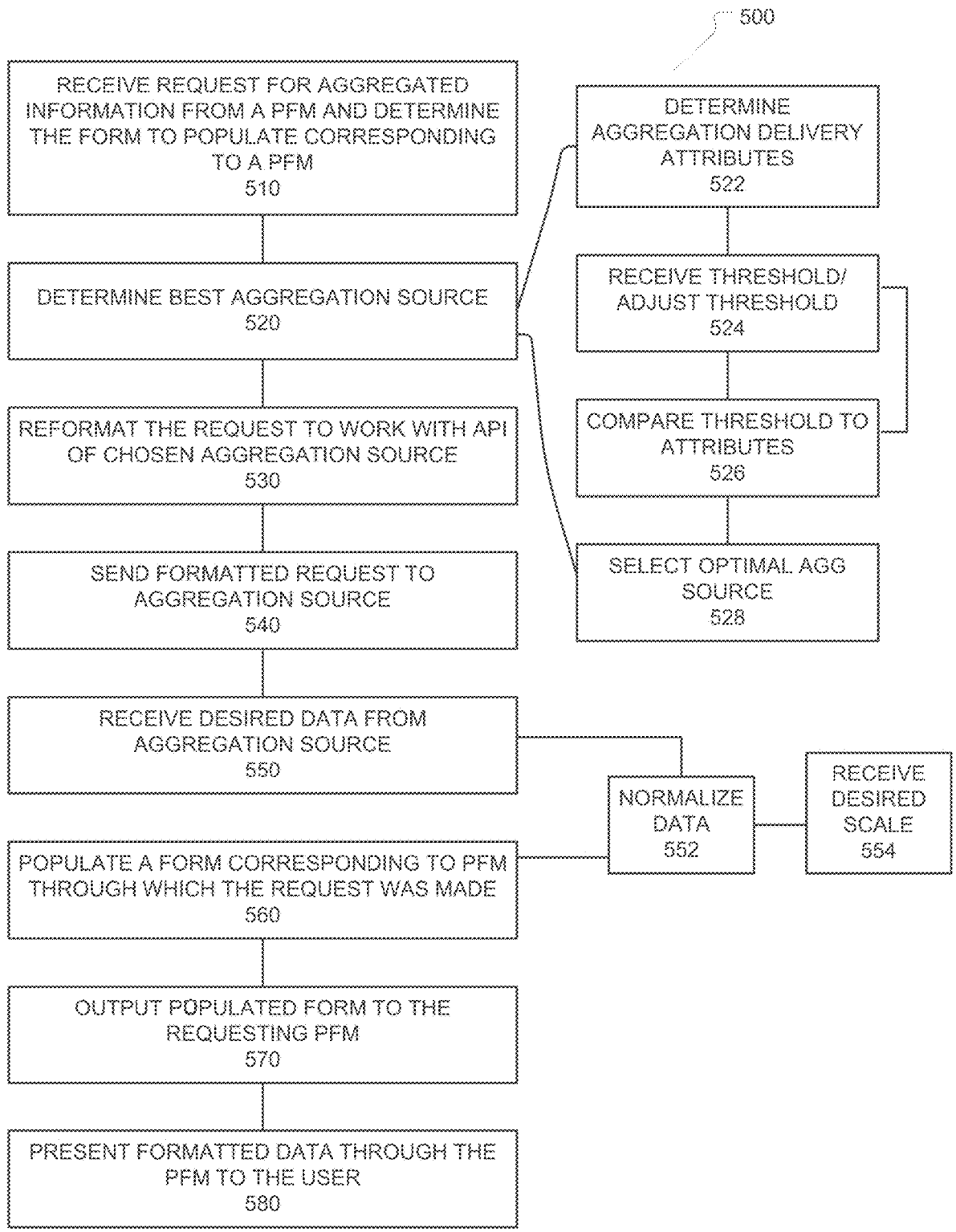
FIG. 5 illustrates a method utilizing an optimized aggregation data source that may additionally normalize the aggregation data so as to portray properly proportioned information to the end user in accordance with the principles and teachings of the disclosure.

FIG. 5 illustrates a method utilizing an optimized aggregation data source that may additionally normalize the aggregation data so as to portray properly proportioned information to the end user. In use, method 500 may comprise the process of receiving a request for aggregated information at 510. The request may come through a PFM. Additionally, the PFM may dictate the final form of aggregated information that will be needed to complete the request.

At 520, an optimal aggregation source may be determined based on the nature of the request. The process at 520 of determining an optimal aggregation source may comprise: identifying aggregation source delivery attributes at 522. At 524, thresholds may be received or set within the system for comparing aggregation source attributes and advantages/shortcomings. It should be noted that the comparison thresholds may be determined on the fly, or may be predetermined within a system that is performing the steps of the method 500. At 526, once the thresholds have been determined the aggregation source attributes may be compared. It will be appreciated that the comparison threshold may correspond to robustness of account information received from each of the aggregation sources. At 528, the optimal aggregation source may be selected based upon the comparison made at 526.

At 530, once an optimal aggregation source has been determined, the user request made through the PFM at 510 may be reformatted to conform to the requirements of the selected aggregation source.

At 540, the properly formatted request may be routed to the selected aggregation source over a network.

At 550, the requested aggregated data may then be received from the aggregation source. In some instances the aggregation data may be improperly skewed or out of proportion relative to existing financial information to be used within the PFM. The out of proportion data may be normalized prior to being introduced within the PFM. At 552, the data may be normalized according to the desired scale factor received at 554. The scale factor may be predetermined based on known attributes of aggregation data from certain aggregation sources. Additionally, the scale factor may be determined on the fly based on preliminary evaluation of the aggregation information received at 550.

At 560, a form or storage array corresponding to the PFM may be populated with the aggregation data and stored in computer memory.

At 570, the populated forms may be outputted to the PFM for use in presenting the aggregation information/data to the user in a meaningful way at 580.

Figure 6:
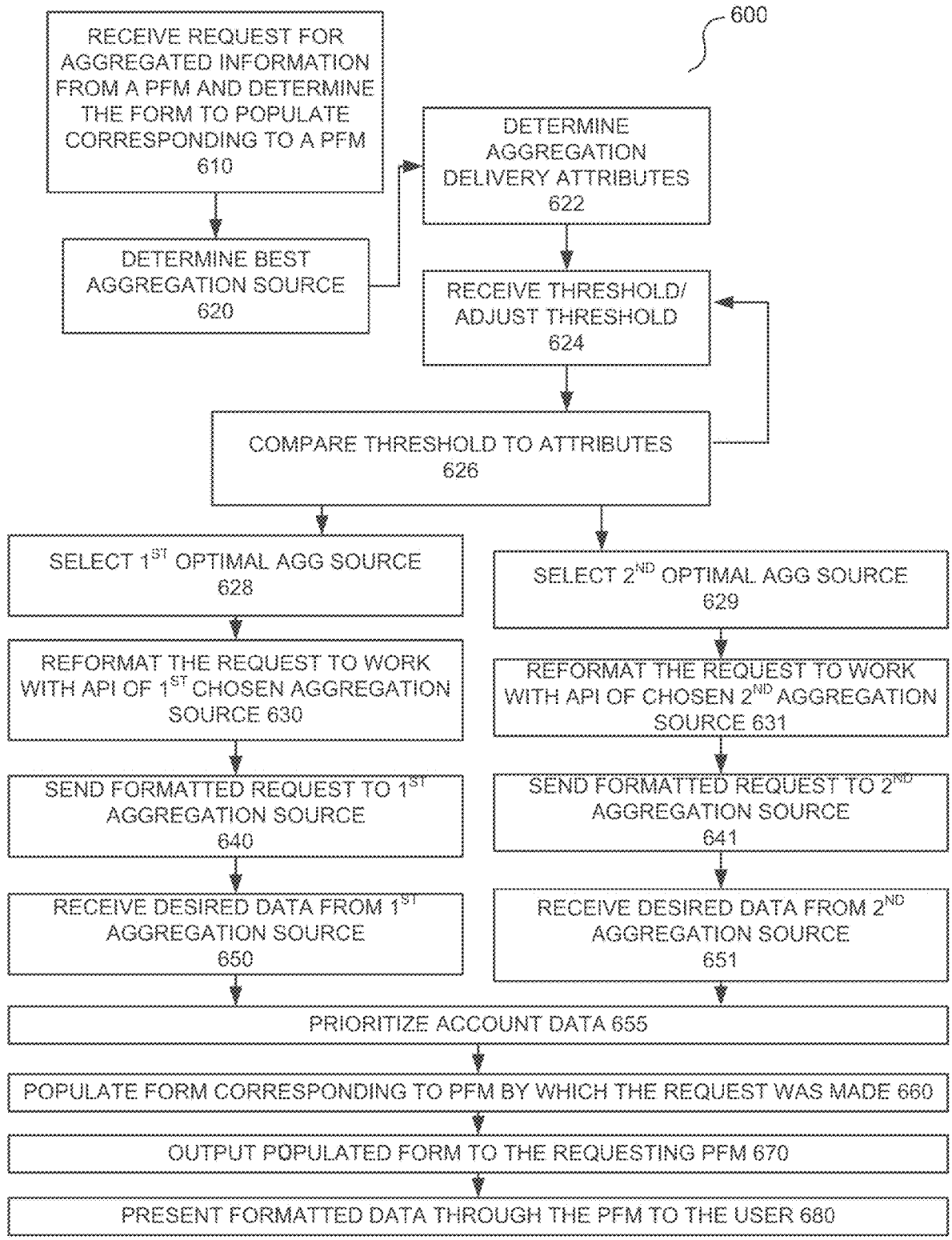
FIG. 6 illustrates a method for determining a first optimal aggregation source and a second optimal aggregation source in accordance with the principles and teachings of the disclosure.

FIG. 6 illustrates a method for determining a first optimal aggregation source and a second optimal aggregation source. In use, method 600 may comprise the process of receiving a request for aggregated information at 610. The request may come through a PFM. Additionally, the PFM may dictate the final form of aggregated information that will be needed to complete the request.

At 620, an optimal aggregation source may be determined based on the nature of the request. The process at 620 of determining an optimal aggregation source may comprise: identifying aggregation source delivery attributes at 622. At 624, thresholds may be received or set within the system for comparing aggregation source attributes and advantages/shortcomings. It should be noted that the comparison thresholds may be determined on the fly, or may be predetermined within a system that is performing the steps of the method 600. At 626, once the thresholds have been determined the aggregation source attributes may be compared. It will be appreciated that the comparison threshold may correspond to robustness of account information received from each of the aggregation sources. At 628, the optimal aggregation source may be selected based upon the comparison made at 626, and at 629, a second or backup optimal aggregation source may be selected based upon the comparison made at 626.

At 630 and 631, once an optimal aggregation source has been determined, the user request made through the PFM at 610 may be reformatted to conform to the requirements of the selected aggregation source.

At 640 and 641, the properly formatted request may be routed to the first selected aggregation source over a network and at 641, the properly formatted request may be routed to the second/backup selected aggregation source over a network At 650, the requested aggregated data may then be received from the first aggregation source and at 651 the requested aggregated data may then be received from the second aggregation source.

At 655, aggregation information from the first and second aggregation sources may be prioritized in order to deal with duplication of information. As discussed in the above example duplication may be found when merging and matching accounts.

At 660, a form or storage array corresponding to the PFM may be populated with the prioritized aggregation data and stored in computer memory.

At 670, the populated forms may be outputted to the PFM for use in presenting the aggregation information/data to the user in a meaningful way at 680.

Figure 7:
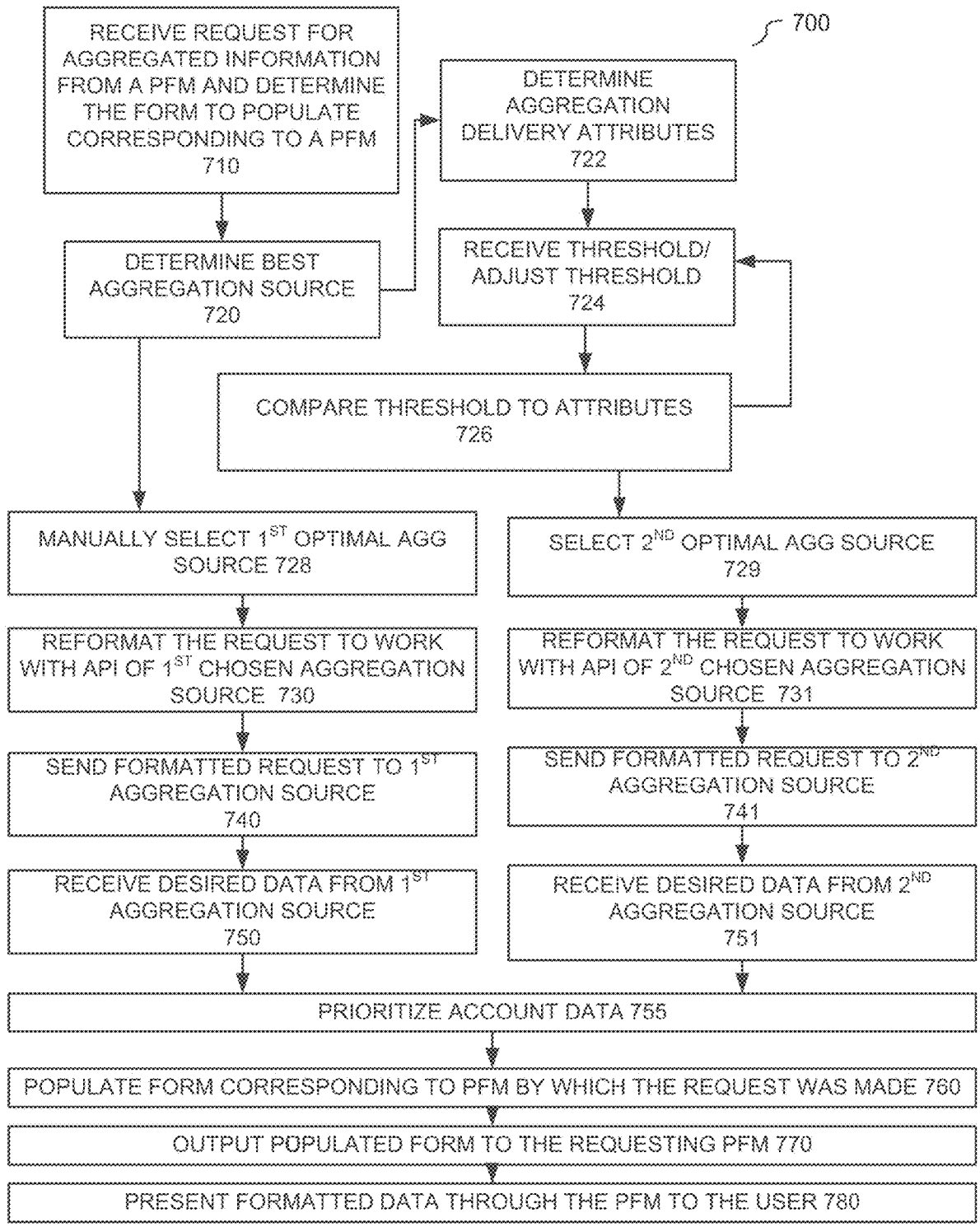
FIG. 7 illustrates an implementation wherein one of the aggregation sources is selected manually or has been predetermined in accordance with the principles and teachings of the disclosure.

FIG. 7 illustrates an implementation wherein one of the aggregation sources is selected manually or has been predetermined. In use, method 700 may comprise the process of receiving a request for aggregated information at 710. The request may come through a PFM. Additionally, the PFM may dictate the final form of aggregated information that will be needed to complete the request.

At 720, an optimal aggregation source may be determined based on the nature of the request. The process at 720 of determining an optimal aggregation source may comprise: identifying aggregation source delivery attributes at 722. At 724, thresholds may be received or set within the system for comparing aggregation source attributes and advantages/shortcomings. It should be noted that the comparison thresholds may be determined on the fly, or may be predetermined within a system that is performing the steps of the method 700. At 726, once the thresholds have been determined the aggregation source attributes may be compared. It will be appreciated that the comparison threshold may correspond to robustness of account information received from each of the aggregation sources. At 728, the optimal aggregation source may be selected manually or may be predetermined prior to running the processes of the method. At 729, a second or backup optimal aggregation source may be selected based upon the comparison made at 726.

At 730 and 731, once an optimal aggregation source has been determined, the user request made through the PFM at 710 may be reformatted to conform to the requirements of the selected aggregation source.

At 740, the properly formatted request may be routed to the first selected aggregation source over a network and at 741, the properly formatted request may be routed to the second/backup selected aggregation source over a network.

At 750, the requested aggregated data may then be received from the first aggregation source and at 751 the requested aggregated data may then be received from the second aggregation source.

At 755, aggregation information from the first and second aggregation sources may be prioritized in order to deal with duplication of information. As discussed in the above example duplication may be found when merging and matching accounts.

At 760, a form or storage array corresponding to the PFM may be populated with the prioritized aggregation data and stored in computer memory.

At 770, the populated forms may be outputted to the PFM for use in presenting the aggregation information/data to the user in a meaningful way at 780.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

The invention claimed is:

1. An apparatus, comprising:
   a processor;
   a memory that stores code executable by the processor to:
   receive a request for aggregated account data accessible from a data aggregator server;
   select a data aggregator server from a plurality of data aggregator servers to service the request for the aggregated account data based on a plurality of factors associated with each of the plurality of data aggregator servers;
   format a request for the aggregated account data to be compatible with the selected data aggregator server;
   route the formatted request over a network to the selected data aggregator server; and
   receive the requested aggregated account data over the network from the selected data aggregator server.

2. The apparatus of claim 1, wherein the code is executable by the processor to:
   determine that the selected data aggregator server is unavailable; and
   select a second data aggregator server from the plurality of data aggregator servers to service requests for aggregated account data based on the plurality of factors.

3. The apparatus of claim 2, wherein the code is executable by the processor to:
   determine delivery attributes for each of the plurality of data aggregator servers; and
   compare the aggregated account data to the delivery attributes of each of the plurality of data aggregator servers to determine if a comparison threshold is met for a particular one of the multiple data aggregator servers.

4. The apparatus of claim 3, wherein the code is executable by the processor to adjust the comparison threshold so that the adjusted comparison threshold is met for the particular one of the multiple data aggregator servers prior to selecting the particular one of the multiple data aggregator servers in response to the comparison threshold not being met for any of the multiple data aggregator servers.

5. The apparatus of claim 1, wherein the plurality of factors for determining the selected data aggregator server from the plurality of data aggregator servers comprises one or more of a cost of a data aggregator server, a speed of the data aggregator server, an historical reliability of the data aggregator server, feasibility of the data aggregator server, support of the data aggregator server, a relationship with a source of the data aggregator server, and whether the data aggregator server was last used.

6. The apparatus of claim 5, wherein the code is executable by the processor to assign an importance criteria to each factor and determine a weighted average of the factors for each data aggregator server.

7. The apparatus of claim 1, wherein the code is executable by the processor to populate a form corresponding to the PFM with the aggregated account data for use in presenting the aggregated account data.

8. The apparatus of claim 1, wherein the request for the aggregated account data originates from a user.

9. The apparatus of claim 1, wherein the request for the aggregated account data originates from PFM software.

10. The apparatus of claim 1, wherein the code is executable by the processor to normalize the received aggregated account data.

11. The apparatus of claim 10, wherein the code is executable by the processor to receive a predetermined data scale for normalizing the received aggregated account data for use in normalizing the received aggregated account data.

12. An apparatus, comprising:
    means for receiving a request for aggregated account data accessible from a data aggregator server;
    means for selecting a data aggregator server from a plurality of data aggregator servers to service the request for the aggregated account data based on a plurality of factors associated with each of the plurality of data aggregator servers;
    means for formatting a request for the aggregated account data to be compatible with the selected data aggregator server;

means for routing the formatted request over a network to the selected data aggregator server; and means for receiving the requested aggregated account data over the network from the selected data aggregator server.

13. The apparatus of claim 12, further comprising means for populating a form corresponding to the PFM with the aggregated account data for use in presenting the aggregated account data.

14. The apparatus of claim 12, further comprising:
means for determining that the selected data aggregator server is unavailable; and
means for selecting a second data aggregator server from the plurality of data aggregator servers to service requests for aggregated account data based on the plurality of factors.

15. The apparatus of claim 14 further comprising:
means for determining delivery attributes for each of the plurality of data aggregator servers; and
means for comparing the aggregated account data to the delivery attributes of each of the plurality of data aggregator servers to determine if a comparison threshold is met for a particular one of the multiple data aggregator servers.

16. The apparatus of claim 15, further comprising means for adjusting the comparison threshold so that the adjusted comparison threshold is met for the particular one of the multiple data aggregator servers prior to selecting the particular one of the multiple data aggregator servers in response to the comparison threshold not being met for any of the multiple data aggregator servers.

17. The apparatus of claim 12, wherein the plurality of factors for determining the selected data aggregator server from the plurality of data aggregator servers comprises one or more of a cost of a data aggregator server, a speed of the data aggregator server, an historical reliability of the data aggregator server, feasibility of the data aggregator server, support of the data aggregator server, a relationship with a source of the data aggregator server, and whether the data aggregator server was last used.

18. The apparatus of claim 17, further comprising means for assigning an importance criteria to each factor and determine a weighted average of the factors for each data aggregator server.

19. The apparatus of claim 12, further comprising:
means for receiving a predetermined data scale for normalizing the received aggregated account data for use in normalizing the received aggregated account data; and
means for normalizing the received aggregated account data.

20. A computer program product comprising a computer readable storage medium storing computer usable program code executable to perform operations, the operations comprising:
receiving a request for aggregated account data accessible from a data aggregator server;
selecting a data aggregator server from a plurality of data aggregator servers to service the request for the aggregated account data based on a plurality of factors associated with each of the plurality of data aggregator servers;
formatting a request for the aggregated account data to be compatible with the selected data aggregator server;
routing the formatted request over a network to the selected data aggregator server; and
receiving the requested aggregated account data over the network from the selected data aggregator server.

* * * * *